United States Patent
Cardona et al.

(10) Patent No.: US 7,835,373 B2
(45) Date of Patent: Nov. 16, 2010

(54) METHOD AND APPARATUS FOR BUFFER LINKING IN BRIDGED NETWORKS

(75) Inventors: Omar Cardona, Austin, TX (US); James Brian Cunningham, Austin, TX (US); Baltazar De Leon, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 11/693,914

(22) Filed: Mar. 30, 2007

(65) Prior Publication Data

US 2008/0240127 A1 Oct. 2, 2008

(51) Int. Cl.
*H04L 12/28* (2006.01)
*H04L 12/56* (2006.01)

(52) U.S. Cl. .................. 370/401; 370/402; 370/404
(58) Field of Classification Search .......... 370/401
See application file for complete search history.

(56) References Cited

U.S. PATENT DOCUMENTS

| | | | |
|---|---|---|---|
| 2002/0078271 A1* | 6/2002 | Berry | 710/36 |
| 2004/0215907 A1 | 10/2004 | Pizel | |
| 2004/0255047 A1 | 12/2004 | Larson et al. | |
| 2005/0228936 A1 | 10/2005 | Kuo et al. | |
| 2005/0235068 A1* | 10/2005 | Moriki et al. | 710/5 |
| 2006/0026327 A1 | 2/2006 | Arndt et al. | |
| 2006/0064523 A1* | 3/2006 | Moriki et al. | 710/62 |
| 2006/0195618 A1 | 8/2006 | Arndt et al. | |
| 2006/0195623 A1 | 8/2006 | Arndt et al. | |
| 2006/0195642 A1 | 8/2006 | Arndt et al. | |
| 2006/0195675 A1 | 8/2006 | Arndt et al. | |
| 2006/0212608 A1 | 9/2006 | Arndt et al. | |
| 2006/0212620 A1 | 9/2006 | Arndt et al. | |
| 2006/0212870 A1 | 9/2006 | Arndt et al. | |
| 2006/0242333 A1* | 10/2006 | Johnsen et al. | 710/30 |
| 2007/0067432 A1* | 3/2007 | Tarui et al. | 709/223 |
| 2008/0235409 A1 | 9/2008 | Ryzhykh | |

OTHER PUBLICATIONS

U.S. Appl. No. 11/751,302, filed May 21, 2007, Cardona, et al.

* cited by examiner

*Primary Examiner*—Brian A Zimmerman
*Assistant Examiner*—Frederick Ott
(74) *Attorney, Agent, or Firm*—Mitch Harris, Atty at Law, LLC; Andrew M. Harris; Matthew W. Baca

(57) ABSTRACT

A computer implemented method and apparatus are provided for transferring data in a logical partitioned data processing system. A receiving adapter receives data from a network. The receiving adapter transfers the data to a pre-mapped buffer if the data is to be sent to a target adapter. A virtual bridge receives the pre-mapped buffer from the receiving adapter and transfers the pre-mapped buffer to the target adapter. The target adapter receives the pre-mapped buffer from the virtual bridge and determines that the received buffer is pre-mapped. The target adapter accesses the pre-mapped buffer using pre-mapped mapping, and transmits the data contained therein.

20 Claims, 6 Drawing Sheets

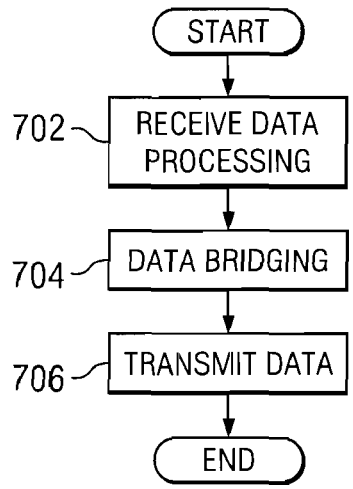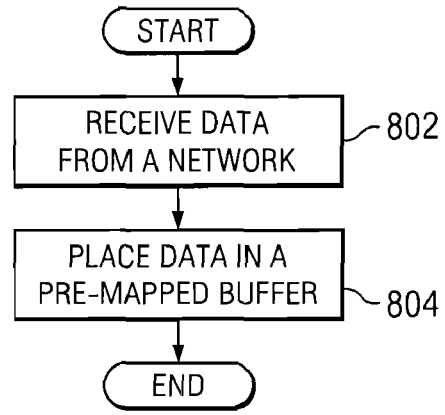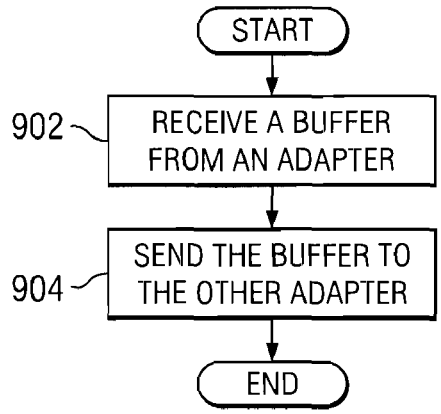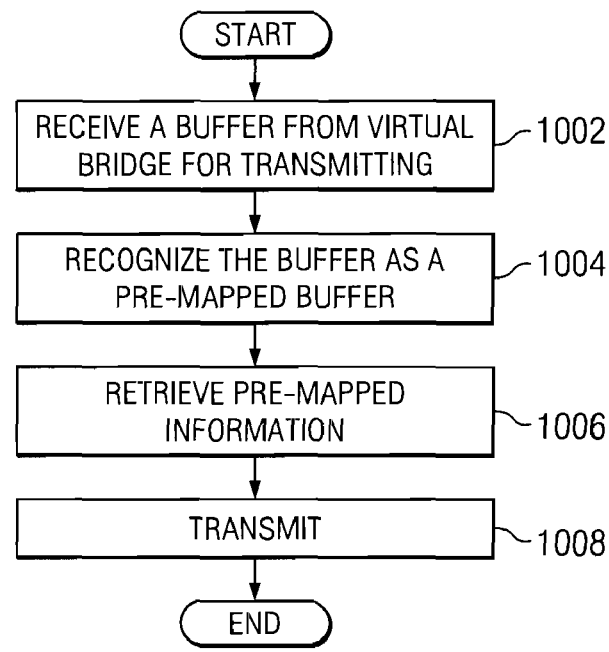

METHOD AND APPARATUS FOR BUFFER LINKING IN BRIDGED NETWORKS

BACKGROUND OF THE INVENTION

1. Field of the Invention

The present invention relates generally to an improved data processing system, and in particular, to a computer implemented method, apparatus, and computer usable program code for faster data communication. Still more particularly, the present invention relates to a computer implemented method, apparatus, and computer usable program code for improving the data communication between network adapters in a bridged network by providing direct access to the transmit and receive buffers of a network adapter to the other bridged network adapters.

2. Description of the Related Art

Technology exists to partition a single server data processing system such that the single server data processing system functions as multiple independent virtual servers, or logical partitions. Each logical partition, or virtual server, is a logical partitioned data processing system (LPAR). In a logical partitioned data processing system, the various logical partitions communicate with each other and outside networks, like the Internet, using network adapters. These network adapters can be physical network adapters, such as a physical Ethernet adapter. These network adapters can also be virtual network adapters, such as a virtual Ethernet adapter. Virtual network adapters are network adapters implemented in software, but appear and behave like physical network adapters from the point of view of a logical partition.

A network bridge is a device that connects two or more network components, such as two or more network adapters. A network bridge, which is also referred to simply as a bridge, manages the network data traffic flowing between connected network components. This function of the bridge is called bridging. The connected network components are called bridged components, and the network that results from bridging several network components via a network bridge is called a bridged network.

Similar to the network adapters, network bridges can also be physical or virtual in nature. A virtual network bridge is a network bridge implemented in software. A virtual network bridge is also referred to as a virtual bridge. In effect, a virtual bridge, such as a virtual Ethernet bridge, appears and behaves like a physical network bridge from the point of view of a bridged network.

Usually, a virtual bridge facilitates connectivity amongst the several virtual and physical network adapters in a logical partitioned data processing system. One or more logical partitions in a logical partitioned data processing system can host one or more virtual bridges. One logical partition hosting one virtual bridge for several logical partitions in a logical partitioned data processing system environment is a common bridging configuration. The logical partition that hosts the virtual bridge in such configurations is called the hosting partition.

In a logical partitioned data processing system, network adapters, whether physical or virtual, pass all packets of data to the virtual bridge for further distribution. The virtual bridge then processes the data packets for sending to other network adapters, or to the hosting partition for use locally on the hosting partition. The virtual bridge uses bridging logic to perform this processing. The bridging logic is a part of an operating system provided functionality called a host operating system stack, which contains the bridging logic for managing data communication in a data processing system.

SUMMARY OF THE INVENTION

The illustrative embodiments provide a computer implemented method and apparatus for transferring data in a logical partition data processing system, A receiving adapter receives data from a network. The receiving adapter then determines if the data is to be sent to a target adapter. If the data is to be sent to a target adapter, the receiving adapter transfers the received data to a pre-mapped buffer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a flowchart of a data transfer process in accordance with an illustrative embodiment;

FIG. 8 depicts a flowchart of a process for receiving data in a modified adapter in accordance with an illustrative embodiment;

FIG. 9 depicts a flowchart of a process for bridging network adapters in accordance with an illustrative embodiment; and FIG. 10 depicts a flowchart of a process for transmitting data in a bridged network in accordance with an illustrative embodiment.

DETAILED DESCRIPTION OF THE PREFERRED EMBODIMENT

Figure 1:
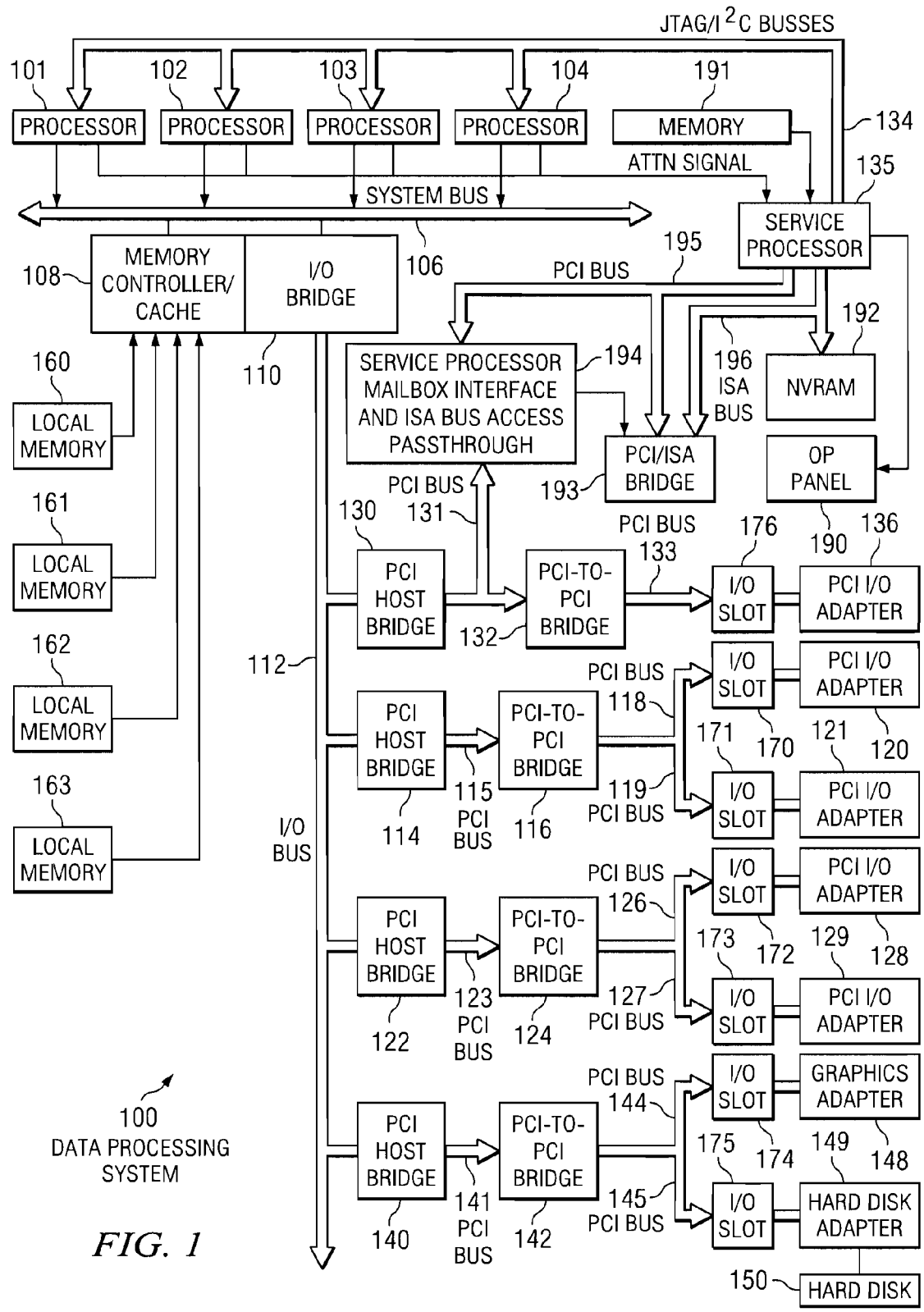
FIG. 1 depicts a block diagram of a data processing system in which illustrative embodiments may be implemented.

With reference now to the figures, and in particular with reference to FIG. 1, this figure depicts a block diagram of a data processing system in which illustrative embodiments may be implemented. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned data processing system (LPAR). Thus, data processing system 100 may have multiple heterogeneous operating systems, or multiple instances of a single operating system running simultaneously. Any number of software programs may be executed within each of these multiple operating systems. Data processing system 100 is logically partitioned such that different PCI I/O adapters 120, 121, 128, 129, and 136, graphics adapter 148, and hard disk adapter 149 may be assigned to a different logical partition. In this case, graphics adapter 148 connects to a display device (not shown), while hard disk adapter 149 connects to and controls hard disk 150. PCI I/O adapters 120, 121, 128, 129, and 136, are examples of physical network adapters.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three logical partitions P1, P2, and P3. In these examples, memories 160, 161, 162, and 163 may take the form of dual in-line memory modules (DIMMs). DIMMs are not normally assigned on a per DIMM basis to logical partitions. Instead, a logical partition will get a portion of the overall memory seen by the platform. For example, host processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to logical partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within the logical partition of data processing system 100. Thus, for example, one instance of the Advanced Interactive Executive (AIX) operating system may be executing within logical partition P1, a second instance (image) of the AIX operating system may be executing within logical partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). PCI I/O adapters 120 and 121 each provide an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128 and 129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. PCI bus 131 also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to PCI/ISA bridge 193. NVRAM storage 192 connects to ISA bus 196. Service processor 135 connects to service processor mailbox interface and ISA bus access pass-through logic 194 through local PCI bus 195. Service processor 135 also connects to host processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate host processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local memories 160, 161, 162, and 163. Service processor 135 then releases host processors 101, 102, 103, and 104 for execution of the code loaded into local memories 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by host processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or a "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

Figure 2:
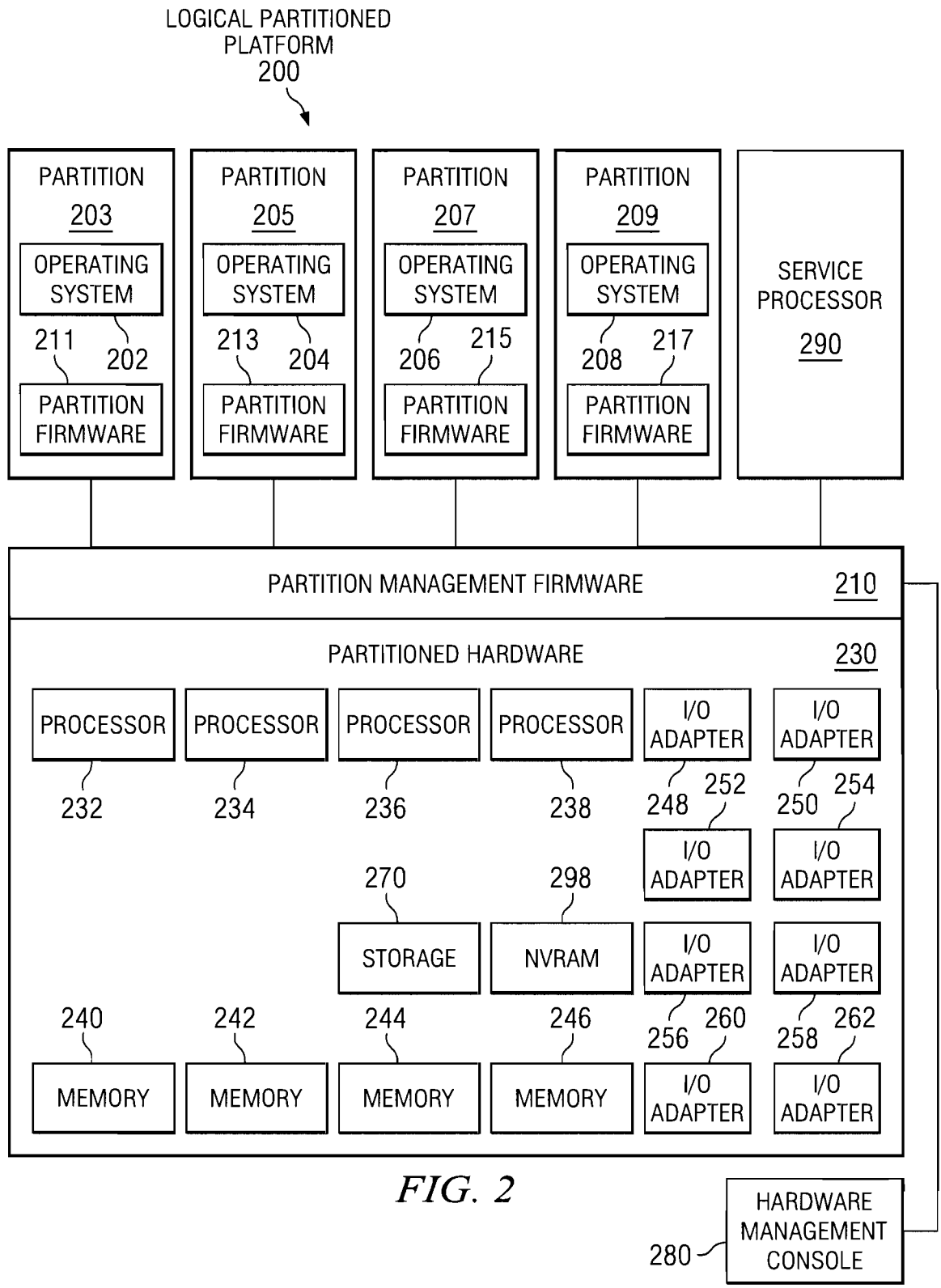
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, and 208, and partition management firmware 210. Operating systems 202, 204, 206, and 208 may be multiple copies of a single operating system or multiple heterogeneous operating systems simultaneously run on logical partitioned platform 200. Operating systems 202, 204, 206, and 208 may be implemented using OS/400, which is designed to interface with partition management firmware, such as Hypervisor, which is available from International Business Machines Corporation. OS/400 is used only as an example in these illustrative embodiments. Of course, other types of operating systems, such as AIX and Linux, may be used depending on the particular implementation.

In these examples, operating systems 202, 204, 206, and 208 are located in partitions 203, 205, 207, and 209, respectively. Hypervisor software is an example of partition management firmware 210 and is available from International Business Machines Corporation. In these examples, firmware is software stored in a memory chip that holds its content without electrical power. Some examples of this type of storage are read-only memory (ROM), programmable read-only memory (PROM), erasable programmable read-only memory (EPROM), electrically erasable programmable read-only memory (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial bootstrap code, IEEE-1275 Standard Open Firmware, and runtime abstraction software (RTAS), which is available from International Business Machines Corporation. When partitions 203, 205, 207, and 209 are instantiated, a copy of bootstrap code is loaded onto partitions 203, 205, 207, and 209 by partition management firmware 210. Thereafter, control is transferred to the bootstrap code with the bootstrap code then loading the open firmware and runtime abstraction software. The processors associated or assigned to partitions 203, 205, 207, and 209 are then dispatched to each of the partition's respective memories to execute partition management firmware 210.

Partitioned hardware 230 includes processors 232, 234, 236, and 238, memories 240, 242, 244, and 246, input/output (I/O) adapters 248, 250, 252, 254, 256, 258, 260, and 262, storage unit 270, and NVRAM storage 298. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent images of operating systems 202, 204, 206, and 208 by virtualizing all the hardware resources of logical partitioned platform 200.

Service processor 290 may be used to provide various services, such as processing of platform errors in partitions 203, 205, 207, and 209. These services also may act as a service agent to report errors back to a vendor, such as International Business Machines Corporation. Operations of the different partitions 203, 205, 207, and 209 may be controlled through a hardware management console, such as hardware management console 280. Hardware management console 280 is a separate data processing system from which a system administrator may perform various functions including reallocation of resources to different partitions.

Logical partitions can include one or more physical network adapters, such as PCI I/O adapters 120, 121, 128, 129, and 136 of FIG. 1, and one or more virtual network adapters. Each network adapter, whether physical or virtual, allows the logical partition to connect to a data network. Physical network adapters connect to physical networks, and virtual network adapters connect to virtual networks.

A virtual network bridge is a network bridge implemented in software. The virtual network bridge is also referred to as a virtual bridge. In effect, a virtual bridge, such as a virtual Ethernet bridge, appears and behaves just like a physical network bridge from the point of view of a bridged network. Usually, a virtual bridge facilitates connectivity amongst one virtual network adapter and one physical network adapter in a hosting partition.

As data flows across the physical and virtual networks, the physical and virtual network adapters transmit and receive blocks of data through communications links to these networks. Generally, some of the data received by a network adapter is intended for transmission to another network adapter in the logical partitioned data processing system, and some data is intended for local processing on the logical partition to which the network adapter belongs.

Presently, the network adapters simply send all the data to the virtual bridge. The virtual bridge sends the data for local processing on the hosting partition, or performs the processing for routing data to the other network adapters in the logical partitioned data processing system.

An operating system allocates space in the data processing system's memory to various data processing system components. The data processing system components use this designated memory space to perform various functions. A method of accessing this memory space is called direct memory access (DMA). Direct memory access allows a data processing system component to access the memory space allocated to the data processing system component as well as other memory spaces the data processing system component is allowed to access.

Direct memory access utilizes a method of memory address translation by which the data processing system component accesses the allocated memory space. This method of memory address translation is called mapping. Mapping involves translating a memory address, known as virtual memory address, to another memory address known as bus address. Memory space addressed by bus address is called bus memory space. A data processing system component uses a virtual memory address in the data processing system component's operation. The virtual memory address has to be mapped to a corresponding bus address to actually read and write from the bus memory space.

A network adapter, whether physical or virtual, is a data processing system component. In a hosting partition, the operating system allocates memory spaces to physical and virtual adapters. When an adapter reads and writes from memory, the adapter uses the direct memory access method. Direct memory access involves mapping of virtual memory addresses to corresponding bus addresses that access the memory space allocated to the adapter.

Illustrative embodiments recognize that processing for routing the data through a virtual bridge degrades performance in a data processing system. Presently, the virtual bridge utilizes bridging logic that is built into the host operating system stack to perform the bridging function for this data. The degradation in performance in the data processing system comes from the virtual bridge having to send all packets of data through the host operating system stack, and then mapping the data packets in the bus memory space of the network adapter.

Illustrative embodiments provide a computer implemented method, apparatus, and computer program code for improving the performance of data flow in a logical partitioned data processing system. As described below, illustrative embodiments use an improved network adapter and virtual bridge such that dynamic direct memory access mapping for the data flowing from the physical network adapter to the virtual network adapter, and vice versa, through the virtual bridge is avoided. Dynamic direct memory access mapping is direct memory access mapping done at the time the mapping is needed. By avoiding the dynamic direct memory access mapping in a network adapter, illustrative embodiments reduce the data processing that a network adapter presently performs. The reduction in data processing of a network adapter results in improved performance of data communication in logical partitioned data processing systems in comparison with the present performance of the same data communication.

Figure 3:
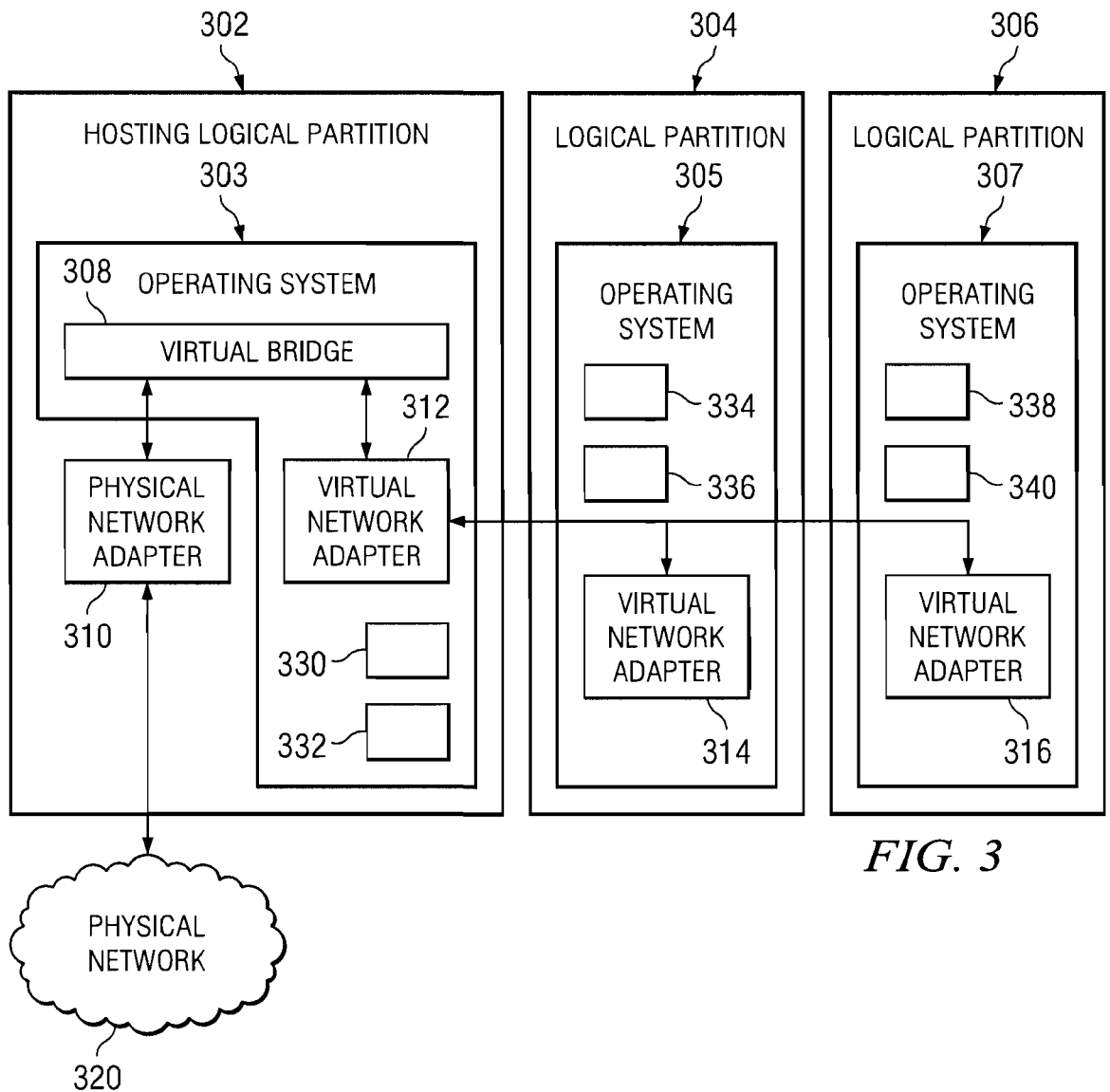
FIG. 3 depicts a block diagram of data networking in a logical partitioned data processing system in accordance with an illustrative embodiment.

With reference now to FIG. 3, the figure depicts a block diagram of data networking in a logical partitioned data processing system in accordance with an illustrative embodiment. Hosting logical partition 302 and logical partitions 304, and 306 can be implemented by using data processing system 100 in FIG. 1. Furthermore, each hosting logical partition 302 and logical partitions 304, and 306 can be situated with respect to each other as partitions 203, 205, 207, and 209 are in FIG. 2. A partition management firmware, such as partition management firmware 210 in FIG. 2, provides the infrastructure to interconnect the logical partitions.

Each logical partition runs a dedicated copy of an operating system to operate the logical partition. Hosting logical partition 302 has operating system 303 running on the partition.

Logical partitions 304 and 306 similarly have operating systems 305 and 307 running on the respective partitions.

In this example, hosting logical partition 302 hosts virtual bridge 308. Virtual bridge 308 communicates with physical network adapter 310 and virtual network adapter 312. Physical network adapter 310 can be a physical Ethernet adapter, such as any one of PCI I/O adapters 120, 121, 128, 129, and 136 in FIG. 1, or any one of I/O adapters 248, 250, 252, 254, 256, 258, 260, and 262 in FIG. 2. Virtual network adapter 312 can be a virtual Ethernet adapter as described above. Note that FIG. 3 depicts one of each of a virtual bridge, a physical network adapter, and a virtual network adapter, only for the clarity of the description of the illustrative embodiment. Particular logical partitioned data processing system configurations with more than one of each of these components are easily conceivable where the illustrative embodiment can be practiced.

Continuing with the description of FIG. 3, logical partition 304 contains virtual network adapter 314. Logical partition 306 similarly contains virtual network adapter 316. Virtual network adapters 314 and 316 communicate with virtual adapter 312 of hosting logical partition 302 over a virtual data network provided by the partition management framework, such as partition management firmware 210 in FIG. 2. Virtual bridge 308 uses virtual network adapter 312 to communicate with other virtual network adapters, such as virtual network adapters 314 and 316 of logical partitions 304 and 306, respectively, over the virtual data network.

Physical network adapter 310 communicates with physical network 320, which may be a local area network (LAN), or a wide area network (WAN) such as the Internet. Descriptions of the following figures illustrate this data communication mechanism in further detail.

One or more device drivers can be running on each logical partition together with other applications. A device driver is a software program that contains the software instructions for operating an associated hardware. Hosting logical partition 302 has device drivers 330 and 332 running under operating system 303. Logical partition 304 has device drivers 334 and 336 running under operating system 305. Logical partition 306 has device drivers 338 and 340 running under operating system 307.

Figure 4:
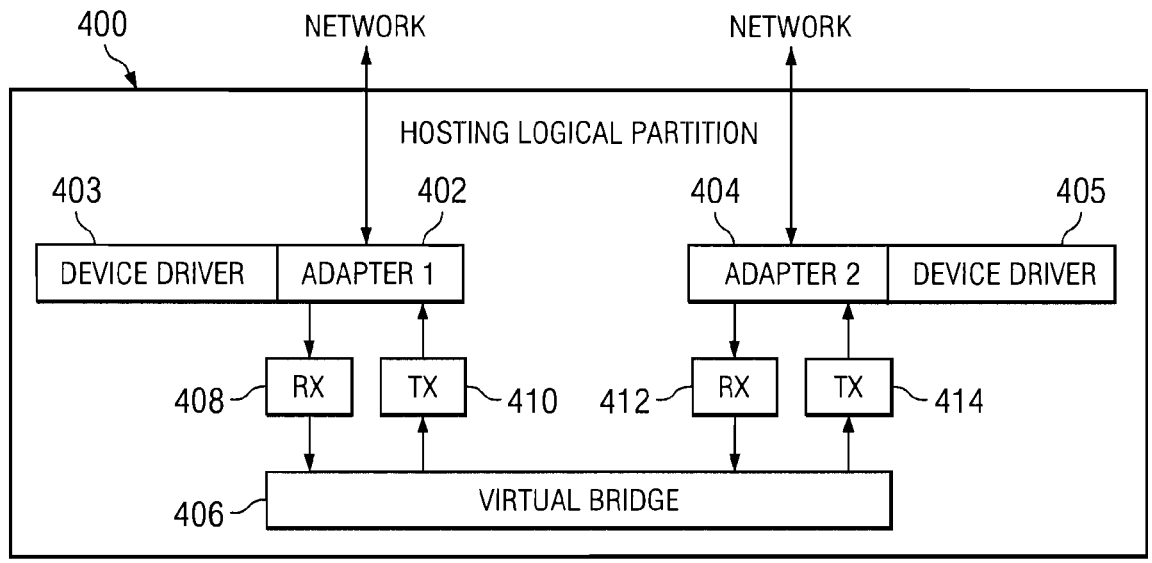
FIG. 4 depicts a block diagram of a data communication mechanism presently used in hosting logical partitioned data processing systems in accordance with an illustrative embodiment.

With reference now to FIG. 4, the figure depicts a block diagram of a data communication mechanism presently used in a logical partitioned data processing system in accordance with an illustrative embodiment. FIG. 4 shows hosting logical partition 400, which can be implemented using hosting logical partition 302 in FIG. 3. The figure shows two adapters 402 and 404 to illustrate the data communication using virtual bridge 406 in the logical partitioned environment. Adapters 402 and 404, and virtual bridge 406 operate in logical partition 400, which is a hosting partition.

Device driver 403 operates adapter 402, and device driver 405 operates adapter 404. Each of device drivers 403 and 405 can be implemented using a device driver, such as any one of device drivers 330, 332, 334, 336, 338, and 340 in FIG. 3.

Adapter 402 can be a physical network adapter, such as physical network adapter 310 in FIG. 3, and adapter 404 can be a virtual network adapter, such as any one of virtual network adapters 312, 314 and 316 in FIG. 3, or vice versa. Adapters 402 and 404 are bridged using virtual bridge 406.

Adapter 402 has access to two data buffer queues 408 and 410. A data buffer queue is an area in memory accessible to a network adapter for use by the network adapter to store the received data and read the data that is to be transmitted. A buffer is a memory space of a certain size. A data buffer queue is also referred to simply as a buffer queue, or a queue. In FIG.

4, buffer queue 408 is a receive buffer queue, and buffer queue 410 is a transmit buffer queue. A receive buffer queue is a buffer queue for storing received data. A transmit buffer queue is a buffer queue for storing data that is to be transmitted. Adapter 404 similarly has access to two buffer queues. Buffer queue 412 is a receive buffer queue, and buffer queue 414 is a transmit buffer queue, both of which are accessible to adapter 404.

Adapters 402 and 404 use their respective receive buffer queues 408 and 412 to store the data each adapter receives. Similarly, adapters 402 and 404 use their respective transmit buffer queues 410 and 414 to read the data each adapter transmits. In accessing a data buffer in each of these buffer queues, each adapter's device driver performs mapping of the buffer such that the virtual memory address of a buffer in a particular buffer queue is mapped to a corresponding bus address for the adapter.

Virtual bridge 406 has control of receive buffer queues 408 and 412 and transmit buffer queues 410 and 414 by taking control of the output and receive routines of the adapters in order to bridge data communication between adapters 402 and 404. Output and receive routines are adapter functions implemented in software, typically in the device driver of an adapter. For example, virtual bridge 406 receives data from receive buffer queue 408 and determines where to send the received data. As an example, virtual bridge 406 may determine that the received data from buffer queue 408 is to be sent to adapter 404. In response to this type of determination, virtual bridge 406 writes the buffer to transmit buffer queue 414 associated with adapter 404. A virtual bridge determines whether a data packet in a buffer is for use in the hosting partition or for sending to another bridged adapter. The virtual bridge makes this determination by processing the contents of the buffer through the bridging functionality in the host operating system stack.

Continuing with this example, virtual bridge 406 can receive from buffer queue 412 of adapter 404 and output to transmit buffer queue 410 of adapter 402. In the manner illustrated in the example above, virtual bridge 406 provides the bridging function to facilitate data communication between adapters 402 and 404.

As described above, presently, the bridging function of a virtual bridge is needed for routing data packets from one adapter to another. The processing performed by the bridging function in the host operating system stack, including mapping, consumes time and other resources on the hosting partition. However, illustrative embodiments recognize that routing data packets from one adapter to another can be performed without using dynamic direct memory access mapping, as described in the illustrative embodiments below.

FIG. 4 depicts only two adapters and one virtual bridge for the clarity of the description of the illustrative embodiment. Furthermore, the above description illustrates a simple data communication mechanism only as an exemplary illustration. Particular logical partitioned data processing system configurations with more than one of each of these components are easily conceivable where the illustrative embodiment can be practiced. For example, using the above description, data communication among several physical and virtual network adapters, communicating with each other and applications local to various logical partitions using one or more virtual bridges is conceivable.

Figure 5:
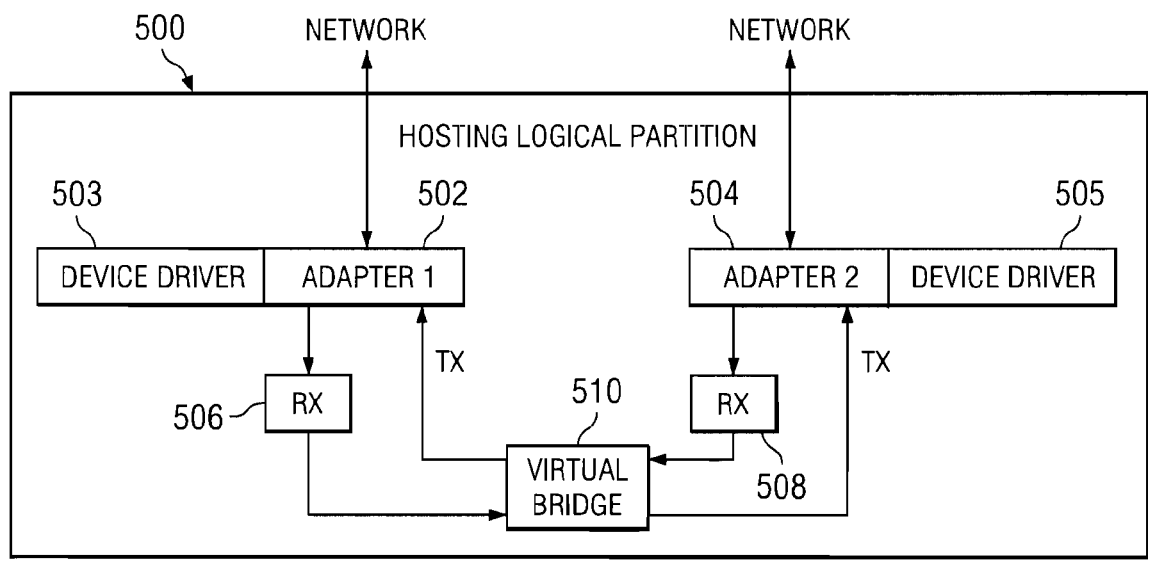
FIG. 5 depicts a block diagram of a first modified data communication mechanism in a hosting logical partitioned data processing system in accordance with an illustrative embodiment.

With reference now to FIG. 5, the figure depicts a block diagram of a first modified data communication mechanism in a logical partitioned data processing system in accordance with an illustrative embodiment. FIG. 5 shows hosting logical partition 500, which can be implemented using hosting logical partition 400 in FIG. 4. As in the description of FIG. 4 above, FIG. 5 shows two adapters 502 and 504 bridged using virtual bridge 510 in logical partition 500, which is a hosting partition.

FIG. 5 depicts only two adapters 502 and 504 and only one virtual bridge 510, where more are easily conceivable, for the clarity of the description of the illustrative embodiment. Furthermore, in the interest of clarity of the description, FIG. 5 is an exemplary depiction where all the data flows only between the two depicted adapters. No data flows to applications local to the logical partitions hosting each adapter. However, such depiction is not intended to be limiting on the illustrative embodiments. The illustrative embodiments can be practiced in configurations involving data flow amongst the adapters as well as to and from applications on the logical partition.

In accordance with an illustrative embodiment, adapter 502 is modified to function with only one buffer queue, namely receive buffer queue 506. Similarly, adapter 504 is modified to function with only one buffer queue, namely receive buffer queue 508. Adapters 502 and 504 can each be implemented using either adapter 402 or adapter 404 in FIG. 4.

Typically, a device driver operates and manages the operation of a network adapter. Device driver 503 operates adapter 502, and device driver 505 operates adapter 504. Each of device drivers 503 and 505 can be implemented using a device driver, such as device drivers 403 and 405 in FIG. 4, and further modified as described below.

A device driver can also emulate in software an otherwise absent hardware, such that applications communicating with the device driver believe they are communicating with a hardware associated with the device driver. When a hardware component, such as a physical network adapter, or an emulated hardware component, such as a virtual network adapter, is to be modified to reflect a changed behavior, part of the modification is implemented in the device driver. As an example, adapter 502 in the modified form involves modified device driver 503 that, at least in part, imparts the modified characteristics to adapter 502 described herein.

Working of each of the modified adapters 502 and 504 is described from the perspective of adapter 502. Adapter 502 is used to describe the modification only as exemplary. The modifications are similarly applicable to adapter 504.

Receive buffer queue 506 contains buffers. Each buffer in receive buffer queue 506 has a virtual address and a bus address that corresponds to that buffer's location in the memory. In the illustrative embodiment, buffers in receive buffer queue 506 are pre-mapped. For the most part, pre-mapping is similar to direct memory access mapping in the address translation that occurs in each mapping. However, pre-mapping is different from direct memory access mapping in that the translation of the virtual address to the bus address is done for a buffer in receive buffer queue 506 ahead of reading or writing that buffer. Similarly, buffers in receive buffer queue 508 of adapter 504 are pre-mapped.

In an unmodified adapter, a transmit buffer queue contains separate buffers. The unmodified adapter performs a direct memory access mapping of a buffer in the transmit buffer queue when the adapter has to perform a read operation on the buffer.

In the modified adapter of the illustrative embodiment, the transmit buffer queue does not contain separate buffers. Instead, the transmit buffer queue consists of pre-mapped buffers from another adapter's receive buffer queue. For example, the transmit buffer queue of adapter 502 consists of pre-mapping of the same buffers in the memory that receive buffer queue 508 of adapter 504 pre-mapped.

The bus addresses of a pre-mapped buffer are different in adapters 502 and 504. However, the virtual address of a pre-mapped buffer in the transmit buffer queue of adapter 502 and receive buffer queue 508 of adapter 504 are the same and reference the same buffer in the memory. In this manner, a modified adapter is able to use another modified adapter's receive buffer queue for a transmit buffer queue. In this manner, each modified adapter is able to function with just one buffer queue instead of two buffer queues.

In order to be used for transmission in the manner described above, each pre-mapped buffer in a receive buffer queue contains a marker. The marker is a piece of data within the pre-mapped buffer that indicates to the modified adapter that the buffer being read for transmission is a pre-mapped buffer and does not require direct memory access mapping at runtime. In a specific implementation of the illustrative embodiment, the marker can contain the bus address of the pre-mapped buffer.

Adapter 504 is modified similar to adapter 502 to function with only one buffer queue, namely, receive buffer queue 508. For transmitting, adapter 504 is modified to read a pre-mapped buffer, which is a buffer in a buffer queue other than the transmit buffer queue of adapter 504. Here, adapter 504 pre-maps buffers from receive buffer queue 506 of adapter 502.

Virtual bridge 510 is a virtual bridge that can be implemented using virtual bridge 406 in FIG. 4, modified as described below. Thus, virtual bridge 510 is a modified virtual bridge in accordance with the illustrative embodiment.

An unmodified virtual bridge processes all received buffers through the bridging functionality in the host operating system stack. This processing includes receiving a buffer from the receive buffer queue of one adapter and outputting the buffer to the transmit buffer queue of another adapter.

Virtual bridge 510 is modified to have access to the pre-mapped buffers in receive buffer queue 506 of adapter 502. Virtual bridge 510 receives the pre-mapped buffer in response to adapter 502 writing a pre-mapped buffer in receive buffer queue 506. Virtual bridge 510 then sends the pre-mapped buffer to adapter 504 for transmission.

In a specific implementation of the illustrative embodiment, virtual bridge 510 can send the pre-mapped buffer to adapter 504 by invoking a function for transmitting the pre-mapped buffer in the adapter.

Upon receiving the pre-mapped buffer from virtual bridge 510, device driver 505 for adapter 504 determines that the buffer is pre-mapped. Device driver 505 makes this determination using the marker in the pre-mapped buffer. Device driver 505, having determined that the buffer is pre-mapped, has information about the bus address for the buffer. Using this information, device driver 505 sets up the direct memory access to adapter 504 without having to perform a runtime mapping.

In a reversed data flow, adapter 502 similarly reads a pre-mapped buffer that has also been pre-mapped to receive buffer queue 508 of adapter 504. This manner of data communication between adapters in the illustrative embodiment makes buffers from one adapter's receive buffer queue accessible to another adapter as if each adapter has both receive and transmit buffer queues available.

Therefore, the illustrative embodiment enables adapters 502 and 504 to communicate with each other through virtual bridge 510 using pre-mapped buffers. The illustrative embodiment improves the efficiency of the data communication amongst adapters 502 and 504 because the data that flows between the two adapters does not have to be mapped at runtime for transmitting. For the data that has to be routed to and from adapters 502 and 504, virtual bridge 510 simply facilitates each adapter's access to another adapter's buffer queue for pre-mapped buffers in the manner described above.

Furthermore, the illustrative embodiment enables adapters 502 and 504 to function with only one buffer queue instead of two buffer queues. Adapters functioning with only one buffer queue reduce the overall memory requirement of each adapter, and therefore reduce the total resources used in a logical partitioned data processing system.

Several adapters, both physical and virtual, can be modified to read each other's buffer queues in the manner described in this illustrative embodiment. In this manner, a logical partitioned data processing system with several logical partitions can implement the illustrative embodiment, improve the data communication performance, and reduce the resource usage on each logical partition.

Figure 6:
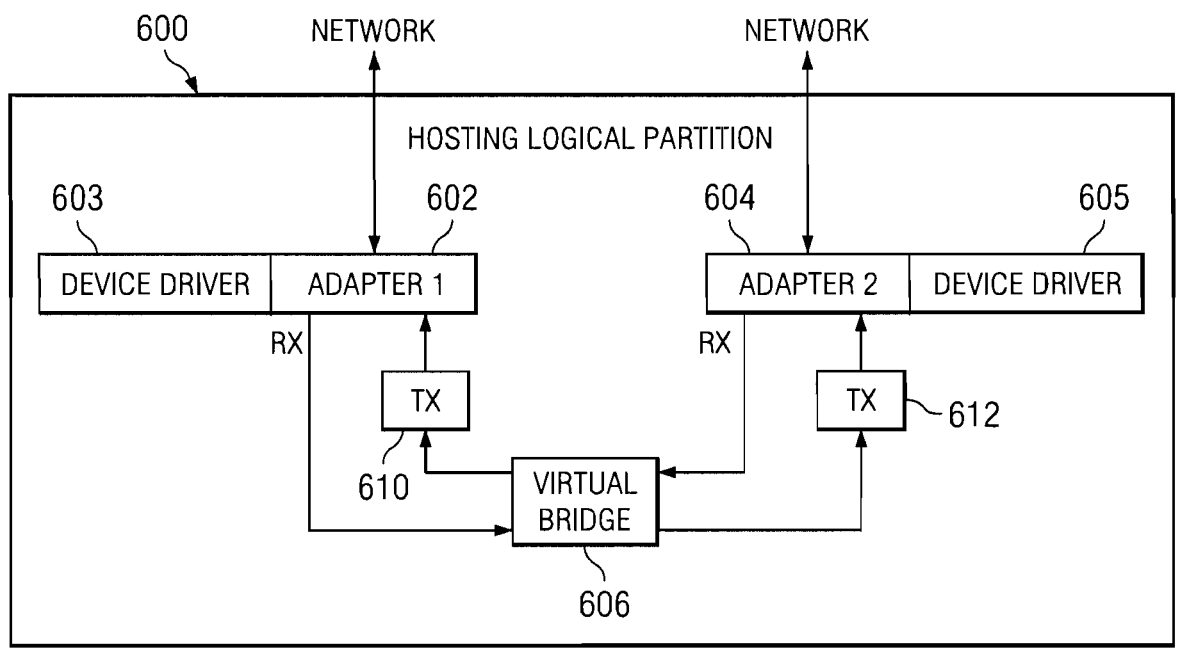
FIG. 6 depicts a block diagram of a second modified data communication mechanism in a logical partitioned data processing system in accordance with an illustrative embodiment.

With reference now to FIG. 6, the figure depicts a block diagram of a second modified data communication mechanism in a logical partitioned data processing system in accordance with an illustrative embodiment. FIG. 6 shows logical partition 600, which can be implemented using hosting logical partition 500 in FIG. 5. As in the descriptions of FIGS. 4 and 5 above, FIG. 6 depicts two adapters 602 and 604 bridged using virtual bridge 606 in logical partition 600, which is a hosting partition. FIG. 6 depicts two adapters 602 and 604, and one virtual bridge 606, where more are easily conceivable, only for the clarity of the description of the illustrative embodiment, and is not intended to be limiting on the illustrative embodiment. Adapters 602 and 604 can each be implemented using either adapter 402 or adapter 404 as described in FIG. 4, or adapter 502 or adapter 504 of FIG. 5.

Device driver 603 operates adapter 602, and device driver 605 operates adapter 604. Each of device driver 603 and device driver 605 can be implemented using device drivers 503 and 505 in FIG. 5, further modified in the manner described below.

Furthermore, in the interest of clarity of the description as in FIG. 5, FIG. 6 is an exemplary depiction where all the data flows only between the two depicted adapters. No data flows to applications local to the logical partitions hosting each adapter.

In accordance with an illustrative embodiment, adapter 602 is modified to function with only one buffer queue, namely transmit buffer queue 610. Similarly, adapter 604 is modified to function with only one buffer queue, namely transmit buffer queue 612. The modifications to adapters 602 and 604 are similar to the modifications to adapters 502 and 504 in FIG. 5 with some differences. Adapters 602 and 604 are modified to contain pre-mapped buffers in their respective transmit buffer queues 610 and 612, whereas adapters 502 and 504 in FIG. 5 contained pre-mapped buffers in their respective receive buffer queues 506 and 508.

The operation of the configuration shown in FIG. 6 follows the same principle as described with respect to the configuration in FIG. 5. In FIG. 5 the adapters write the received data to a pre-mapped receive buffer queue. In FIG. 5, the adapters read the transmit data from a pre-mapped buffer in another adapter's receive buffer queue.

In the configuration depicted in FIG. 6, however, each adapter writes the received data in a pre-mapped buffer in the other adapter's transmit buffer queue. In this configuration, each adapter reads transmit data from a pre-mapped buffer in the adapter's own transmit buffer queue.

Thus, an exemplary operation of the configuration depicted in FIG. 6 is as follows. Adapter 602 receives data and places the data in a pre-mapped buffer. Virtual bridge 606 passes the pre-mapped buffer to adapter 604. Adapter 604 determines by looking at the marker in the pre-mapped buffer that the buffer passed to adapter 604 is a pre-mapped buffer. Device driver 605 retrieves information about accessing the pre-mapped buffer passed by virtual bridge 606. Device driver 605 retrieves the pre-mapped buffer information and accesses the buffer by direct memory access to adapter 604. The same principle applies to the data flow in the reverse direction, to wit, from adapter 604 to adapter 602.

Therefore, the illustrative embodiment improves the efficiency of data communication amongst adapters 602 and 604 because for the data that flows between the two adapters, an adapter does not have to perform runtime mapping for transmitting. For the data that has to be routed to and from adapters 602 and 604, virtual bridge 606 simply facilitates each adapter's access to another adapter's buffer queue for pre-mapped buffers in the manner described above.

Furthermore, the illustrative embodiment enables adapters 602 and 604 to function with only one buffer queue instead of two buffer queues. Adapters functioning with only one buffer queue reduce the overall memory requirement of each adapter, and therefore reduce the total resources used on a logical partitioned data processing system.

Several network adapters, both physical and virtual, can be modified to read each other's queues in the manner described in this illustrative embodiment. In this manner, a logical partitioned data processing system with several logical partitions can implement the illustrative embodiment described above for improving the data communication performance.

FIGS. 5 and 6 are described above for a simplified data communication scenario where all the data flows between the bridged adapters and no data has to be routed to applications local to the logical partition that hosts a particular adapter. Illustrative embodiments can be adapted to address the common data communication scenario where data flows to the other bridged adapter as well as applications local to the logical partition.

With reference now to FIG. 7, a flowchart of a data transfer process is depicted in accordance with an illustrative embodiment. This flowchart depicts a high-level overall data transfer process that can be implemented using the configuration shown in either FIG. 5 or FIG. 6. Subsequent flowcharts in FIGS. 7-10 describe the steps of this overall data transfer process in greater detail.

The process begins with receiving a data packet from a network (step 702). Step 702 can be implemented in an adapter, such as adapter 602 in FIG. 6. If the data has to be bridged, the process provides data bridging (step 704). Step 704 can be implemented in a virtual bridge, such as virtual bridge 606 in FIG. 6. The process then transmits the bridged data (step 706). Step 706 can be implemented in a second adapter, such as adapter 604 in FIG. 6. The process ends thereafter.

With reference now to FIG. 8, a flowchart of a process for receiving data in a modified adapter is depicted in accordance with an illustrative embodiment. The process can be implemented in an adapter modified according to the illustrative embodiments described above in FIGS. 5 and 6. For example, the process can be implemented in adapter 602 and corresponding device driver 603 in FIG. 6.

The process begins by receiving a data packet from a network (step 802). The data is placed in a pre-mapped buffer (step 804). The process ends thereafter.

With reference now to FIG. 9, a flowchart of a process for bridging network adapters is depicted in accordance with an illustrative embodiment. The process can be implemented using a modified virtual bridge, such as virtual bridge 606 in FIG. 6.

The process begins by receiving a buffer from an adapter (step 902). The process sends the pre-mapped buffer to a bridged adapter other than the adapter from which the buffer was received (step 904). The process ends thereafter.

With reference now to FIG. 10, a flowchart of a process for transmitting data in a bridged network is depicted in accordance with an illustrative embodiment. The process can be implemented using a modified adapter, such as adapter 604 and the corresponding device driver 605 in FIG. 6.

The process begins with receiving a buffer from a virtual bridge for transmission (step 1002). Next, the process recognizes the buffer as a pre-mapped buffer (step 1004). The process then retrieves pre-mapped information for the pre-mapped buffer containing the data that is to be transmitted (step 1006). The process then transmits the data in the pre-mapped buffer (step 1008). The process ends thereafter.

In the configurations described above, the adapters have been modified to support specific functions that network adapters do not presently perform in the manner described. Specifically, the adapters are modified to determine the destination of the data the adapters receive. The adapters are further modified to manage multiple transmit and receive buffer queues. The adapters are further modified to identify and use pre-mapped buffers.

As described above, these modifications are achieved at least by implementing the modifications in the software program code of the adapter device drivers. Other methods of implementing the adapter modifications are easily conceivable. For example, the functions of determining data packet destination and reading/writing the data from several buffer queues can be implemented in a separate and perhaps intermediate layer, such as partition management firmware 210 in FIG. 2.

Similarly, the modifications in the virtual bridge can be achieved at least by implementing the modifications in the software program code of the virtual bridge. Other methods of implementing the virtual bridge modifications are easily conceivable.

The illustrative embodiments described above allow network adapters to read and write data into pre-mapped buffers in order to improve the data communication efficiency among network adapters. By reading and writing data into pre-mapped buffers, the network adapters are able to efficiently transfer data without the data buffers requiring direct memory access mapping at runtime. The illustrative embodiments can be similarly implemented in configurations involving data communication between applications and network adapters using virtual adapters, while maintaining the efficiency gains with respect to the data communication between adapters.

The illustrative embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of virtual bridging between a first device adapter and a second device adapter in a data processing system, the method comprising:
   receiving data from the first device adapter and first transferring the data to a buffer provided to the first device adapter from a first device driver, wherein the buffer has a first bus address associated with a virtual address of the buffer in memory, and wherein the first device adapter uses the first bus address to access the buffer to transfer the data into the buffer;
   from a virtual bridge, communicating a second bus address of the buffer to a second device driver associated with the second device adapter, wherein the second bus address of the buffer is associated with the virtual address of the buffer in memory; and
   second transferring the data from the buffer to the second device adapter using the second bus address, whereby the virtual bridge maps an input queue of the first device driver to an output queue of the second device driver without requiring the second device driver to map the virtual address of the buffer to the second bus address.

2. The method of claim 1, wherein the communicating the second bus address of the buffer is performed by writing the second bus address into a predetermined location of the buffer, whereby the second device driver reads the second bus address from the buffer.

3. The method of claim 1, wherein the second device driver determines whether the buffer is a pre-mapped buffer and wherein the second transferring the data from the buffer to the second device adapter using the second bus address is performed responsive to determining that the buffer is a pre-mapped buffer.

4. The method of claim 1, wherein the second device adapter is a second physical device adapter, and wherein the second transferring comprises performing a direct memory access to transfer the data from the second bus address to the first physical device adapter.

5. The method of claim 4, wherein the second device adapter is a second virtual device adapter, and wherein the second transferring comprises performing a virtualized direct memory access transfer to transfer the data from the second bus address to the second virtual device adapter.

6. The method of claim 1, wherein the first device adapter is a first physical device adapter, and wherein the first transferring comprises performing a direct memory access to transfer the data from the first bus address to the first physical device adapter.

7. The method of claim 1, wherein the first device adapter is a first network interface adapter, wherein the second device adapter is a second network interface adapter, and wherein the communicating a second bus address is performed responsive to the virtual bridge determining that the data is destined for transmission via the second network interface adapter out of the data processing system.

8. A data processing system, comprising a processor coupled to a memory containing program instructions for hosting a logical partition within the data processing system, and wherein the program instructions further comprise program instructions for virtual bridging between a first device adapter and a second device adapter, the program instructions comprising program instructions for:
   receiving data from the first device adapter and first transferring the data to a buffer provided to the first device adapter from a first device driver, wherein the buffer has a first bus address associated with a virtual address of the buffer in memory, and wherein the first device adapter uses the first bus address to access the buffer to transfer the data into the buffer;
   from a virtual bridge, communicating a second bus address of the buffer to a second device driver associated with the second device adapter, wherein the second bus address of the buffer is associated with the virtual address of the buffer in memory; and
   second transferring the data from the buffer to the second device adapter using the second bus address, whereby the virtual bridge maps an input queue of the first device driver to an output queue of the second device driver without requiring the second device driver to map the virtual address of the buffer to the second bus address.

9. The data processing system of claim 8, wherein the program instructions for communicating the second bus address of the buffer comprise program instructions for writing the second bus address into a predetermined location of the buffer, whereby the second device driver reads the second bus address from the buffer.

10. The data processing system of claim 8, wherein the second device driver comprises program instructions for determining whether the buffer is a pre-mapped buffer and wherein the program instructions for second transferring the data from the buffer to the second device adapter using the second bus address are executed in response to determining that the buffer is a pre-mapped buffer.

11. The data processing system of claim 8, wherein the second device adapter is a second physical device adapter, and wherein the program instructions for second transferring comprise program instructions for performing a direct memory access to transfer the data from the second bus address to the first physical device adapter.

12. The data processing system of claim 11, wherein the second device adapter is a second virtual device adapter, and wherein the program instructions for second transferring comprise program instructions for performing a virtualized direct memory access transfer from the second bus address to the second virtual device adapter.

13. The data processing system of claim 8, wherein the first device adapter is a first physical device adapter, and wherein the program instructions for first transferring comprises performing a direct memory access to transfer the data from the first bus address to the first physical device adapter.

14. The data processing system of claim 8, wherein the first device adapter is a first network interface adapter, wherein the second device adapter is a second network interface adapter, and wherein the program instructions for communicating a second bus address are executed in response to the virtual bridge determining that the data is destined for transmission via the second network interface adapter out of the data processing system.

15. A computer program product comprising a non-transitory tangible computer readable storage media storing program instructions for hosting a logical partition within a data processing system, and wherein the program instructions further comprise program instructions for virtual bridging between a first device adapter and a second device adapter, the program instructions comprising program instructions for:

receiving data from the first device adapter and first transferring the data to a buffer provided to the first device adapter from a first device driver, wherein the buffer has a first bus address associated with a virtual address of the buffer in memory, and wherein the first device adapter uses the first bus address to access the buffer to transfer the data into the buffer;

from a virtual bridge, communicating a second bus address of the buffer to a second device driver associated with the second device adapter, wherein the second bus address of the buffer is associated with the virtual address of the buffer in memory; and second transferring the data from the buffer to the second device adapter using the second bus address, whereby the virtual bridge maps an input queue of the first device driver to an output queue of the second device driver without requiring the second device driver to map the virtual address of the buffer to the second bus address.

16. The computer program product of claim 15, wherein the program instructions for communicating the second bus address of the buffer comprise program instructions for writing the second bus address into a predetermined location of the buffer, whereby the second device driver reads the second bus address from the buffer.

17. The computer program product of claim 15, wherein the second device driver comprises program instructions for determining whether the buffer is a pre-mapped buffer and wherein the program instructions for second transferring the data from the buffer to the second device adapter using the second bus address are executed in response to determining that the buffer is a pre-mapped buffer.

18. The computer program product of claim 17, wherein the second device adapter is a second physical device adapter, and wherein the program instructions for second transferring comprise program instructions for performing a direct memory access to transfer the data from the second bus address to the first physical device adapter.

19. The computer program product of claim 15, wherein the first device adapter is a first physical device adapter, and wherein the program instructions for first transferring comprises performing a direct memory access to transfer the data from the first bus address to the first physical device adapter.

20. The computer program product of claim 15, wherein the first device adapter is a first network interface adapter, wherein the second device adapter is a second network interface adapter, and wherein the program instructions for communicating a second bus address are executed in response to the virtual bridge determining that the data is destined for transmission via the second network interface adapter out of the data processing system.

* * * * *